(12) United States Patent
Kuramoto et al.

(10) Patent No.: US 7,555,699 B2
(45) Date of Patent: Jun. 30, 2009

(54) STORAGE CONTROL CIRCUIT, AND METHOD FOR ADDRESS ERROR CHECK IN THE STORAGE CONTROL CIRCUIT

(75) Inventors: Masahiro Kuramoto, Kawasaki (JP); Masao Koyabu, Kawasaki (JP); Jun Tsuiki, Kawasaki (JP); Junichi Inagaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 646 days.

(21) Appl. No.: 11/236,610

(22) Filed: Sep. 28, 2005

(65) Prior Publication Data

US 2006/0236205 A1    Oct. 19, 2006

(30) Foreign Application Priority Data

Mar. 31, 2005    (JP)    ............................. 2005-100541

(51) Int. Cl.
*G11C 29/00*    (2006.01)
(52) U.S. Cl. ............................. 714/763; 714/52; 714/54
(58) Field of Classification Search ................ 714/763, 714/53–54, 52, 764, 766–768, 785
See application file for complete search history.

(56) References Cited

U.S. PATENT DOCUMENTS 5,949,358 A *    9/1999    Volz et al. .................... 341/102

6,442,726 B1    8/2002    Knefel
6,457,154 B1 *   9/2002   Chen et al. .................... 714/768

FOREIGN PATENT DOCUMENTS

| EP | 0 127 118 | 12/1984 |
|----|-----------|---------|
| EP | 0 922 254 | 6/1999 |
| JP | 52-2244 | 1/1977 |
| JP | 53-62936 | 6/1978 |
| JP | 55-8617 | 1/1980 |
| JP | 2-206855 | 8/1990 |
| JP | 8-235793 | 9/1996 |

OTHER PUBLICATIONS

European Search Report issued in corresponding European Patent Application No. 05253806.3-2224.

* cited by examiner

*Primary Examiner*—Guy J Lamarre
(74) *Attorney, Agent, or Firm*—Fujitsu Patent Center

(57) ABSTRACT

A method for address error check in a storage control circuit having a storage unit operable to store data in a storage area specified by an address encodes a first code assigned to the address with an even number of bits, encodes a second code assigned to the data written to the storage unit with an odd number of bits, generates a check code based on the first and second codes and stores the check code in the storage unit in correspondence with the data written to the storage unit, and conducts an error check based on data read from the storage unit, a check code corresponding to the data read, and a read address, thus detecting a multi-bit address error.

7 Claims, 12 Drawing Sheets

FIG.3A

|    | D00 | D01 | D02 | D03 | D04 | D05 | D06 | D07 | D08 | D09 | D10 | D11 | D12 | D13 | D14 | D15 |
|----|-----|-----|-----|-----|-----|-----|-----|-----|-----|-----|-----|-----|-----|-----|-----|-----|
| C0 |     |     | x   |     |     |     | x   |     |     | x   |     |     |     | x   |     |     |
| C1 |     |     |     | x   | x   |     |     |     |     |     | x   |     |     |     | x   |     |
| C2 |     |     |     |     | x   | x   | x   | x   |     |     |     | x   | x   |     |     |     |
| C3 |     |     |     |     |     |     |     | x   |     |     |     |     | x   | x   | x   | x   |
| C4 | x   | x   | x   | x   | x   | x   | x   | x   |     |     |     |     |     |     |     | x   |
| C5 | x   | x   | x   | x   |     |     |     |     | x   | x   | x   | x   | x   | x   | x   | x   |
| C6 | x   |     |     |     |     |     |     |     | x   | x   | x   | x   |     |     |     |     |
| C7 |     | x   |     |     |     | x   |     |     | x   |     |     |     |     |     |     |     |

FIG.3B

|    | D16 | D17 | D18 | D19 | D20 | D21 | D22 | D23 | D24 | D25 | D26 | D27 | D28 | D29 | D30 | D31 |
|----|-----|-----|-----|-----|-----|-----|-----|-----|-----|-----|-----|-----|-----|-----|-----|-----|
| C0 | x   |     |     |     |     |     |     |     | x   | x   | x   | x   |     |     |     |     |
| C1 |     | x   |     |     |     | x   |     |     | x   |     |     |     |     |     |     |     |
| C2 |     |     | x   |     |     |     | x   |     |     | x   |     |     |     | x   |     |     |
| C3 |     |     |     | x   | x   |     |     |     |     |     | x   |     |     |     | x   |     |
| C4 |     |     |     |     | x   | x   | x   | x   |     |     |     |     | x   | x   |     |     |
| C5 |     |     |     |     |     |     |     |     | x   |     |     |     |     | x   | x   | x   |
| C6 | x   | x   | x   | x   | x   | x   | x   | x   |     |     |     |     |     |     |     | x   |
| C7 | x   | x   | x   | x   |     |     |     |     | x   | x   | x   | x   | x   | x   | x   | x   |

FIG.3C

|    | A0 | A1 | A2 | A3 | A4 | A5 | A6 | A7 | A8 |
|----|----|----|----|----|----|----|----|----|----|
| C0 | x  | x  | x  | x  | x  | x  | x  |    |    |
| C1 | x  |    |    |    |    |    |    | x  | x  |
| C2 |    | x  |    |    |    |    |    | x  |    |
| C3 |    |    | x  |    |    |    |    |    | x  |
| C4 |    |    |    | x  |    |    |    |    |    |
| C5 |    |    |    |    | x  |    |    |    |    |
| C6 |    |    |    |    |    | x  |    |    |    |
| C7 |    |    |    |    |    |    | x  |    |    |

FIG.7

| | C0 | C1 | C2 | C3 | C4 | C5 | C6 | C7 |
|---|---|---|---|---|---|---|---|---|
| A0 | x | | x | | | | | |
| A1 | x | | | x | | | | |
| A2 | x | | | | x | | | |
| A3 | | | x | | | x | | |
| A4 | | | x | | | | x | |
| A5 | | | x | | | | | x |
| A6 | x | x | | | | | | |
| A7 | | | x | | x | | | |
| A8 | | | | | x | | x | |

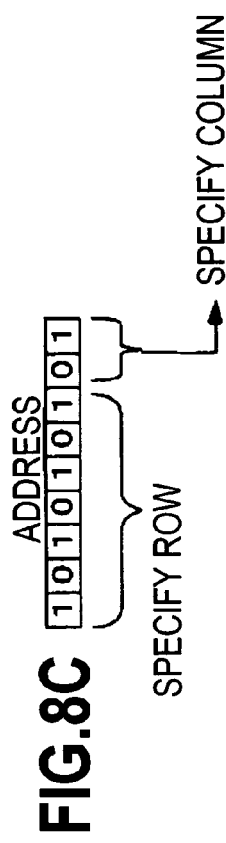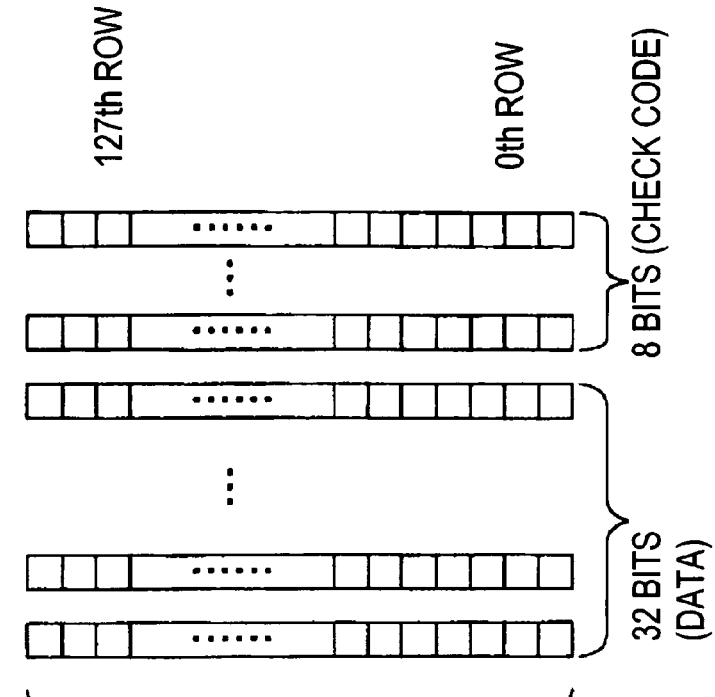
FIG.8A
FIG.8B
FIG.8C

FIG.10

|    | C0 | C1 | C2 | C3 | C4 | C5 | C6 | C7 |
|----|----|----|----|----|----|----|----|----|
| A0 | x  | x  |    |    |    |    |    |    |
| A1 | x  |    | x  |    |    |    |    |    |
| A2 | x  |    |    | x  |    |    |    |    |
| A3 | x  |    |    |    | x  |    |    |    |
| A4 | x  |    |    |    |    | x  |    |    |
| A5 | x  |    |    |    |    |    | x  |    |
| A6 | x  |    |    |    |    |    |    | x  |
| A7 |    | x  | x  |    |    |    |    |    |
| A8 |    |    | x  |    | x  |    |    |    |
| AX | x  | x  | x  | x  | x  | x  | x  | x  |

STORAGE CONTROL CIRCUIT, AND METHOD FOR ADDRESS ERROR CHECK IN THE STORAGE CONTROL CIRCUIT

BACKGROUND OF THE INVENTION

1. Field of the Invention

The present invention relates to a storage control circuit for memory, etc., and more particularly, to a storage circuit for detecting an address-related multi-bit error, and a method of checking errors in the storage control circuit.

2. Description of the Related Art

A storage area in a storage control circuit for memory, etc., is specified with an address to input data to or output it from the storage control circuit. For example, desired data is written to the storage area specified by an address, whereas data is read from the storage area specified by an address.

In general, storage control circuits may develop errors, including those in the form of an address or data value becoming inverted or fixed to 0s or 1s, because of various causes (e.g., noise in a signal line, a faulty buffer used to relay between signal lines, break in a signal line, software error caused by electromagnetic wave). In the event of an address error during data write, for example, data is written to a storage area different from that at the desired address. This may result in the information processing apparatus such as PC (Personal Computer) incorporating the storage control circuit running away out of control.

Likewise, errors in the data to be written may cause the information processing apparatus to run away out of control, and are therefore not desirable. Address or data errors during data read may similarly significantly affect the information processing apparatus incorporating the storage control circuit.

For this reason, error detection techniques have been proposed in the conventional examples. For instance, generation of an error correcting code (ECC) capable of correcting single bit errors and detecting two-bit errors using address information and data stored in a storage device, is described in Japanese Patent Application Laid-Open Publication Nos. 1980-8617, 1978-62936, 1996-235793, 1990-206855 and 1977-2244.

On the other hand, FIG. 1 illustrates an error detection method according to the prior art. FIG. 1 illustrates an example of a storage control circuit operable to generate a check code based on address parity and data, and write the check code to a specified address together with the data.

An address parity check code generation circuit 11 generates an address code 103 based on a parity bit (odd parity as an example in FIG. 1) of an address specified to write data. FIG. 1 illustrates an example of a bit pattern generated by the address parity check code generation circuit 11. The "x" mark indicates those bits that turn ON when the parity bit is 1.

A data check code generation circuit 12 generates a data code 104 based on the data to be written. Although not illustrated, the bit pattern generated by the data check code generation circuit 12 is designed to provide a desired code.

In the case of FIG. 1, the parity bit (odd parity) of a given address 101 ("01010101") is 1. Therefore, "11111000", a code having the first five bits set to ON, is generated as the address code 103. The data check code generation circuit 12 generates, for example, "00101001" as the data code 104. Taking the exclusive-OR (EOR) of the two generates a check code 105 ("11010001"), and the check code 105 is written to the storage area specified by the address 101 together with data 102 ("00000001").

Then, during a data read, a check code is generated from the read data 102 and the address 101 used to read the data as during a data write. The generated check code is compared with the read check code 105. The mismatch between the two codes is detected as an error.

However, the prior arts have the problem that an address multi-bit error may not always be detected. In the conventional example illustrated in FIG. 1, for example, even if two bits are inverted in the address (e.g., if the first and second bits are switched), the parity bit remains 1. As a result, this inversion is not detected as an error.

SUMMARY OF THE INVENTION

In light of the above, it is an object of the present invention to provide a storage control circuit for detecting an address-related multi-bit error, and a method for error checking in the storage control circuit.

The above object is achieved by providing, as a first aspect of the present invention, a storage control circuit comprising a storage unit operable to store data in a storage area specified by an address; a check code generation unit operable to generate, based on data written to the storage unit and the address specified to write the data, a check code to be stored in the storage unit in correspondence with the data written to the storage unit; and a check code inspection unit operable to conduct an error check based on data read from the storage unit, a check code corresponding to the data read, and the address specified to read the data, wherein the check code generation unit and the check code inspection unit encode a first code assigned to the address with an even number of bits, and a second code assigned to the data written to the storage unit with an odd number of bits, and wherein the check code generation unit and the check code inspection unit generate or inspect a check code corresponding to the data written or the data read based on the first and second codes.

It is preferred that the address be delimited and divided into a plurality of groups each having one or a plurality of bits, and that the first code be encoded with an even number of bits using a bit pattern that can identify the fault of every one or plurality of bits in each of the plurality of groups. Preferably, the address is further assigned a roll bit whose value is inverted each time addresses, specified to write the data to or read it from the storage unit, cycle; and wherein the first code assigned to the address containing the roll bit is encoded with an even number of bits.

The above object is attained by providing, as a second aspect of the present invention, a method of checking address errors in a storage control circuit having a storage unit operable to store data in a storage area specified by an address, the method comprising encoding a first code assigned to the address with an even number of bits; encoding a second code assigned to the data written to the storage unit with an odd number of bits; generating a check code based on the first and second codes and storing the check code in the storage unit in correspondence with the data written to the storage unit; and conducting an error check based on data read from the storage unit, a check code corresponding to the data read, and a read address.

It is preferred that the address be delimited and divided into a plurality of groups each having one or a plurality of bits, and that the first code be encoded with an even number of bits using a bit pattern that can identify the fault of every one or plurality of bits in each of the plurality of groups. The address may further be assigned a roll bit whose value is inverted each time addresses, specified to write the data to or read it from the storage unit, cycle, and the first code assigned to the address containing the roll bit may be encoded with an even number of bits.

Use of the address error check method according to the present invention allows detection of an address-related multi-bit error without increasing the check code bit count.

BRIEF DESCRIPTION OF THE DRAWINGS

The above and other objects, aspects, features and advantages of the present invention will become more apparent from the following detailed description when taken in conjunction with the accompanying drawings, in which:

FIGS. 3A to 3C are views illustrating examples of bit patterns generated by check code generation and inspection circuits; FIG. 3A is a view illustrating a bit pattern of the first 16 bits of 32-bit data; FIG. 3B is a view illustrating a bit pattern of the last 16 bits of the 32-bit data; FIG. 3C is a view illustrating a bit pattern related to an 9-bit address;

FIG. 7 is an example of an address-related bit pattern aimed at reducing the stage count of EOR gates;

FIG. 8A is a view illustrating the physical memory configuration in the present embodiment; FIG. 8B is an extracted and explanatory view of a column; FIG. 8C is an explanatory view of address grouping;

FIG. 10 is an example of an address-related bit pattern when the roll bit is assigned.

DESCRIPTION OF THE PREFERRED EMBODIMENT

An embodiment of the present invention will now be described with reference to the accompanying drawings. It will be understood that the technical scope of the present invention is not limited to the embodiments herein below, but covers the invention as defined in the claims and equivalents thereof.

Figure 1:
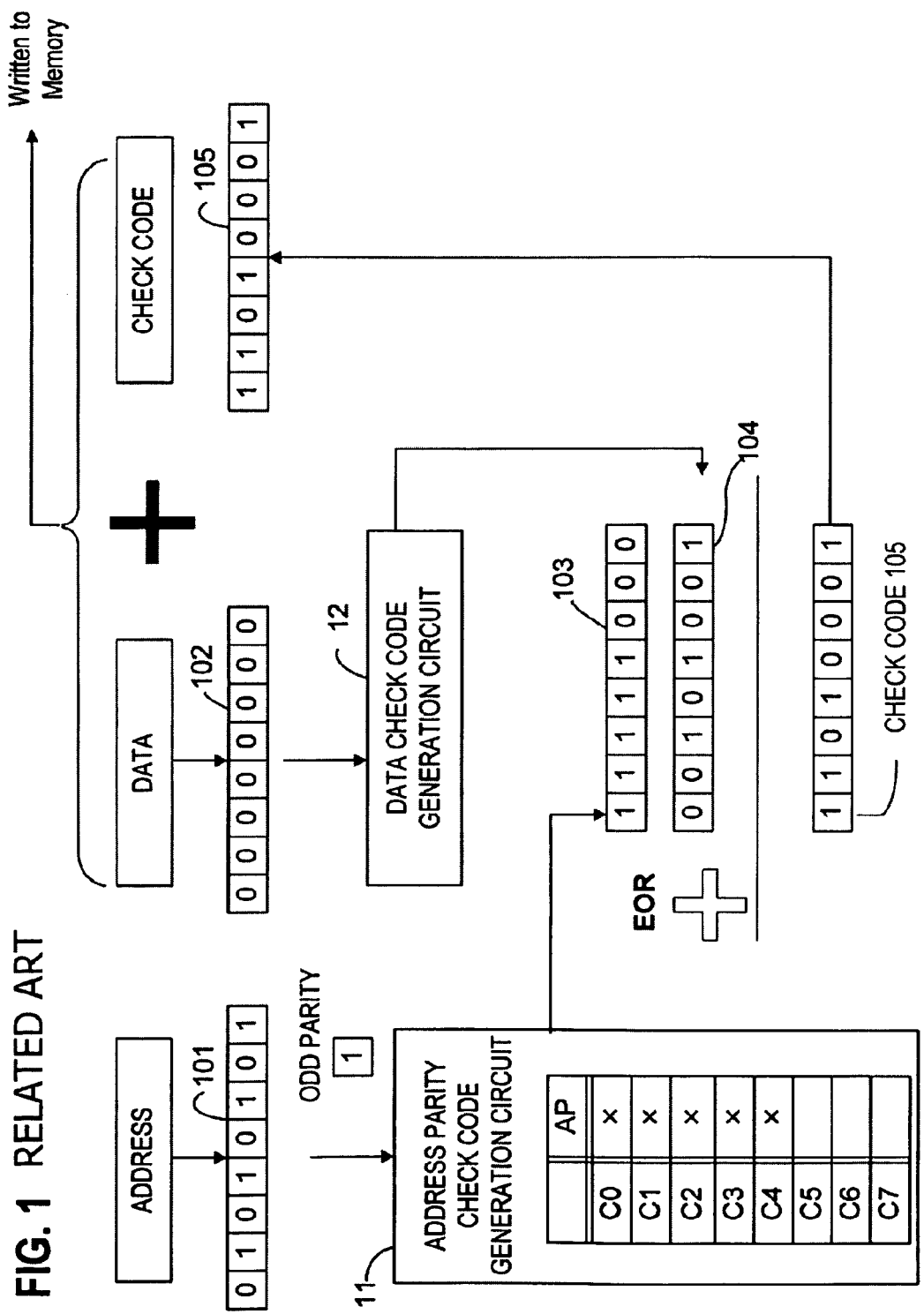
FIG. 1 is an explanatory view of an error detection method according to the prior art.
Figure 2:
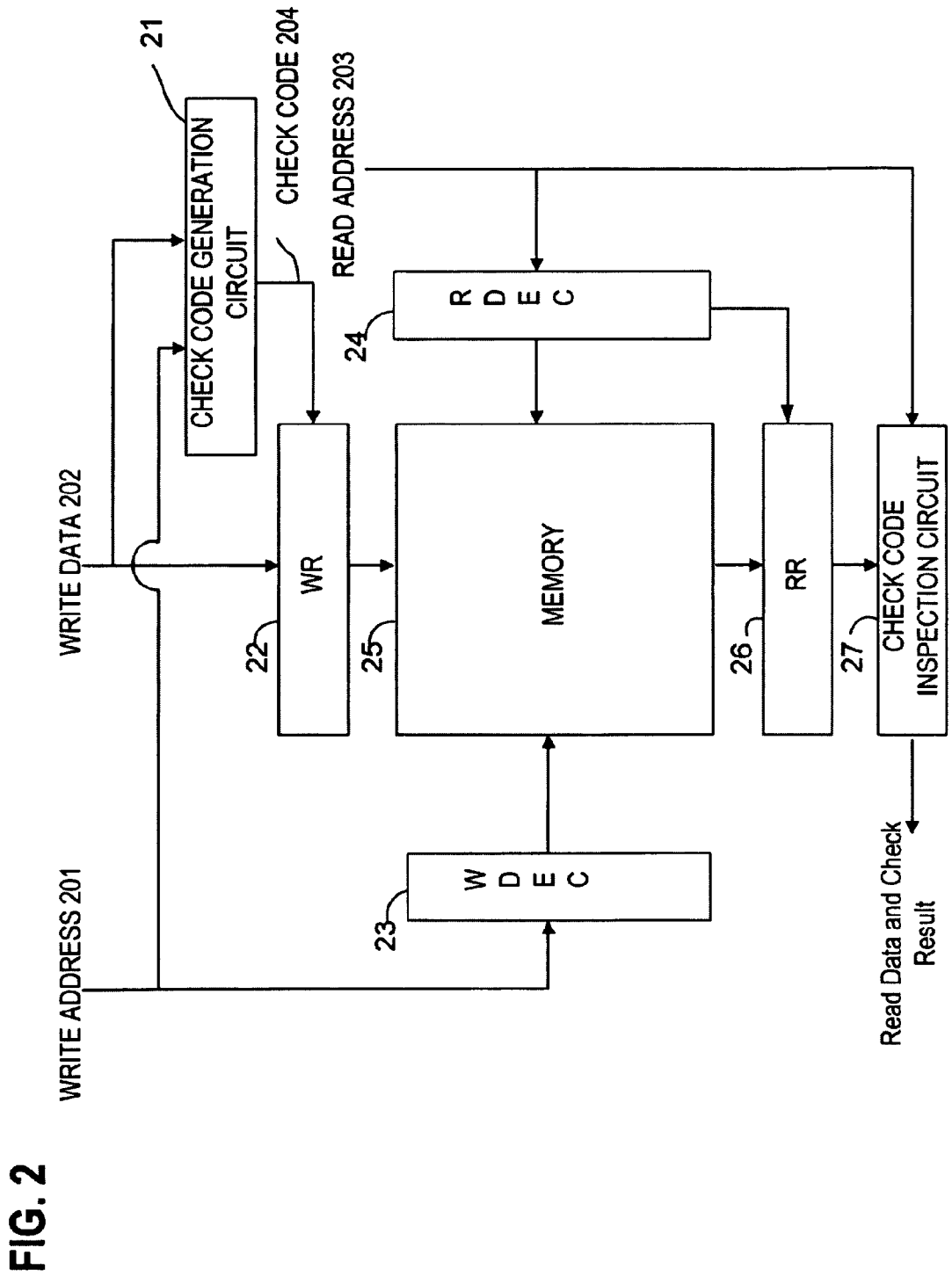
FIG. 2 is a view illustrating a configuration example of a storage control circuit according to an embodiment of the present invention.

FIG. 2 is a view illustrating a configuration example of a storage control circuit according to an embodiment of the present invention. A check code generation circuit 21 receives an address 201 specified to write data (hereinafter referred to as write address) and data 202 to be stored in the storage control circuit (hereinafter referred to as write data).

The check code generation circuit 21 generates a check code to be assigned to the write data 202 based on the write address 201 and the write data 202. A bit pattern generated by the check code generation circuit 21 will be described later with reference to FIGS. 3A to 3C.

A memory 25 is a storage unit in the storage control circuit of the present embodiment. The memory 25 is provided with a plurality of storage elements specified by addresses, and the plurality of storage elements form the storage area.

A write register (WR) 22 receives information to be stored in the memory 25 (the write data 202 and a check code 204). The write register 22 temporarily stores the information to be stored in the memory 25.

A write decoder (WDEC) 23 receives the write address 201. The write decoder 23 drives the storage area in the memory 25 corresponding to the write address 201 to store the information from the write register 22 in the driven storage area.

A read decoder (RDEC) 24 receives a read address 203. The read decoder 24 reads the information stored in the storage area in the memory 25 corresponding to the read address 203 and stores the information in a read register (RR) 26.

The read register 26 receives the information read from the memory 25 (the write data 202 and the check code 204 corresponding to the read address 203). The read register 26 temporarily stores the information read from the memory 25.

A check code inspection circuit 27 receives the read address 203 and the information read from the memory 25 (the write data 202 and the check code 204 corresponding to the read address 203). The check code inspection circuit 27 generates a check code based on the read address 203 and the write data 202 corresponding to the read address 203, and compares the generated check code and the check code 204 corresponding to the read address 203.

In the process of comparison, the check code inspection circuit 27 generates syndrome bits. The syndrome bits refer to a code produced by taking the exclusive-OR of the generated code and the check code 204 corresponding to the read address 203.

The check code inspection circuit 27 determines that no error occurred when the syndrome bits are all 0s, and outputs the write data 202 corresponding to the read address 203. The check code inspection circuit 27 determines that an error occurred if any of the syndrome bits contains a 1, and outputs an error notice. The check code generated by the check code inspection circuit 27 is the same as that generated by the check code generation circuit 21, and will be described later with reference to FIGS. 3A to 3C.

The storage control circuit of the present embodiment is characterized in the bit pattern of the check codes generated by the check code generation circuit 21 and the check code inspection circuit 27. The storage control circuit of the present embodiment encodes with an even number of bits the code to be assigned to the write address 201, encodes with an odd number of bits the code to be assigned to the write data 202, and takes the exclusive-OR (EOR) of the two to generate a check code.

FIGS. 3A to 3C are views illustrating examples of bit patterns generated by the check code generation circuit 21 and the check code inspection circuit 27. FIGS. 3A to 3C illustrate examples of check codes generated by the storage control circuit of the present embodiment for the 32-bit write data 202 and the 9-bit write address 201.

The storage control circuit of the present embodiment encodes the data part with three bits. That is, if the bit is 1 at each bit position in the 32-bit data, the number of bits to be set to ON in the check code generated is three. The storage control circuit of the present embodiment encodes the address part with two bits.

FIG. 3A is a view illustrating a bit pattern of the first 16 bits of the 32-bit data, FIG. 3B a view illustrating a bit pattern of the last 16 bits of the 32-bit data, and FIG. 3C a view illustrating a bit pattern related to the 9-bit address. The "x" mark indicates those bits that are set to ON (in the code generated) when the (data or address) bit is 1.

In the case of 32-bit data "00000000 00000000 00000000 00001010" with 1 in the second and fourth bits from the last for instance, the exclusive-OR of two codes, a code "00001101" made up of bits that are set to ON when "D28" in FIG. 3B is 1 and a code "00010101" made up of bits that are set to ON when "D30" in FIG. 3B is 1, is taken to generate "00011000" as a code (second code) for the data.

When this data is written to address "101010101", the exclusive-OR of five codes, a code "11000000" made up of bits that are set to ON when "A0" in FIG. 3C is 1 and codes "10010000", "100000100", "10000001" and "01010000" made up of bits that are set to ON respectively when "A2", "A4", "A6" and "A8" in FIG. 3C are 1, is taken to generate "00000101" as a code (first code) for the address.

The storage control circuit takes the exclusive-OR of the first code "00000101" for the address and the second code "00011000" for the data to eventually generate a check code. In this case, the check code is "00011101."

On the other hand, bit patterns of the data part are different from one another in FIGS. 3A to 3C. For example, a bit pattern "00001110" for a first bit D00 in the data is different from any other bit patterns for other bits Dxx in the data. Similarly, bit patterns of the address part are different from one another.

As described above, the storage control circuit of the present embodiment changes the coding systems for codes assigned to the address and the data, thus allowing detection of errors occurring in the address. In the storage control circuit of the present embodiment, the code assigned to the address is encoded with two bits. Therefore, errors occurring in the address are detected as two-bit data errors in the syndrome bits.

It is to be noted that although the storage control circuit encodes the code assigned to the write address 201 with two bits and the code assigned to the write data 202 with three bits in the present embodiment, the numbers of bits used for encoding are not limited thereto. In general, a similar effect as with the present embodiment can be obtained as long as the code assigned to the write address 201 is encoded with two or more even number of bits, and the code assigned to the write data 202 with three or more odd number of bits.

In the present embodiment, if the bit pattern of the syndrome bits is the same as that in FIG. 3A or 3B, this means a single bit error of the corresponding data bit. The correct data can be obtained when the corresponding data bit is inverted (corrected). On the other hand, the bit pattern with only one of the syndrome bits set to ON represents a single bit error of a check code, and this error can be ignored. When the syndrome bits are all 0s, this means that no error has occurred. If the syndrome bits do not fit any of these cases, a two-bit data or address error is recognized.

To detect a two-bit data error, each data bit is assigned a bit pattern made up of three or more odd number of bits as illustrated in FIGS. 3A and 3B. This causes the syndrome bits to take on an even bit pattern as a result of exclusive-ORing of two odd bit patterns in the event of inversion of two arbitrary data bits, thus allowing to recognize the inversion as a two-bit error. As for an address error, since even bit patterns are assigned, the syndrome bits take on an even bit pattern as a result of exclusive-ORing of two even bit patterns in the event of inversion of one or a plurality of bits. Therefore, the inversion can be recognized as a two-bit error.

In the bit pattern example of FIG. 3C, bit patterns are assigned separately to two groups, one group from bits A0 to A6 and another from bits A7 to A8. In the bit pattern example of FIG. 3C, the syndrome bits take on an even bit pattern with two or more bits in all faulty combinations in the address groups (arbitrary combinations of bits 1 to 7). Therefore, any such combination can be recognized as a two-bit error. It is to be noted that, in the event of a fault involving three or more bits that spans the two address groups (e.g., fault involving the simultaneous inversion of bits A0, A1 and A7), the syndrome bits are all set to 0s. As a result, the error cannot be detected. However, each of the address groups is made up of bits with a remote likelihood of becoming simultaneously faulty. Therefore, chances are few that an undetectable fault, that sets all the syndrome bits to 0s, will occur.

Figure 4:
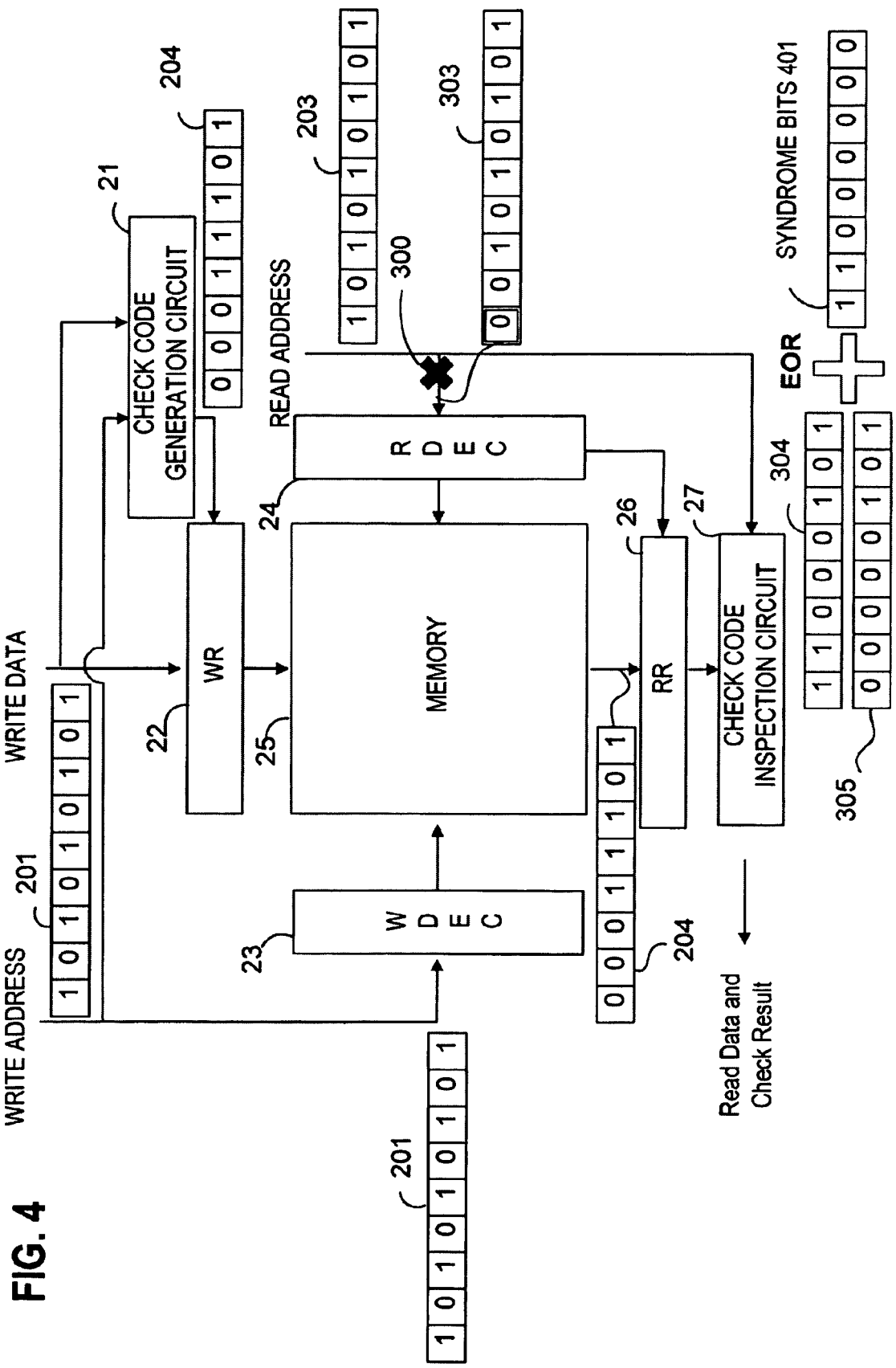
FIG. 4 is an explanatory view of how error detection is carried out in the case of a single bit error in a read address.

FIG. 4 is an explanatory view of how error detection is carried out in the case of a single bit error in the read address 203. This figure illustrates how a single bit inversion occurs in the address because of a faulty location 300 halfway along the path through which the read address 203 is input to the read decoder 24. A data write is carried out normally, and the data and the check code are stored at an address "101010101."

Then, the read address 203 ("101010101") is specified to read the data written. The read decoder 24 receives a faulty address 303 ("001010101") as a result of the read address 203 passing through the faulty location 300 and developing a single bit inversion (the first bit in the read address inverted here). The data and the check code stored at the corresponding address are input to the check code inspection circuit 27 via the read register 26.

On the other hand, the read address 203 is input normally to the check code inspection circuit 27. The check code inspection circuit 27 generates syndrome bits 401 based on the data and check code that have been read and the read address 203.

The generated syndrome bits 401 are the exclusive-OR of a check code 304 ("11000101") at the faulty address 303 ("001010101") and a check code 305 ("00000101") at the read address 203 ("101010101"). Here, the syndrome bits 401 are "11000000", and a single bit inversion in the address is detected as a two-bit data error.

Figure 5:
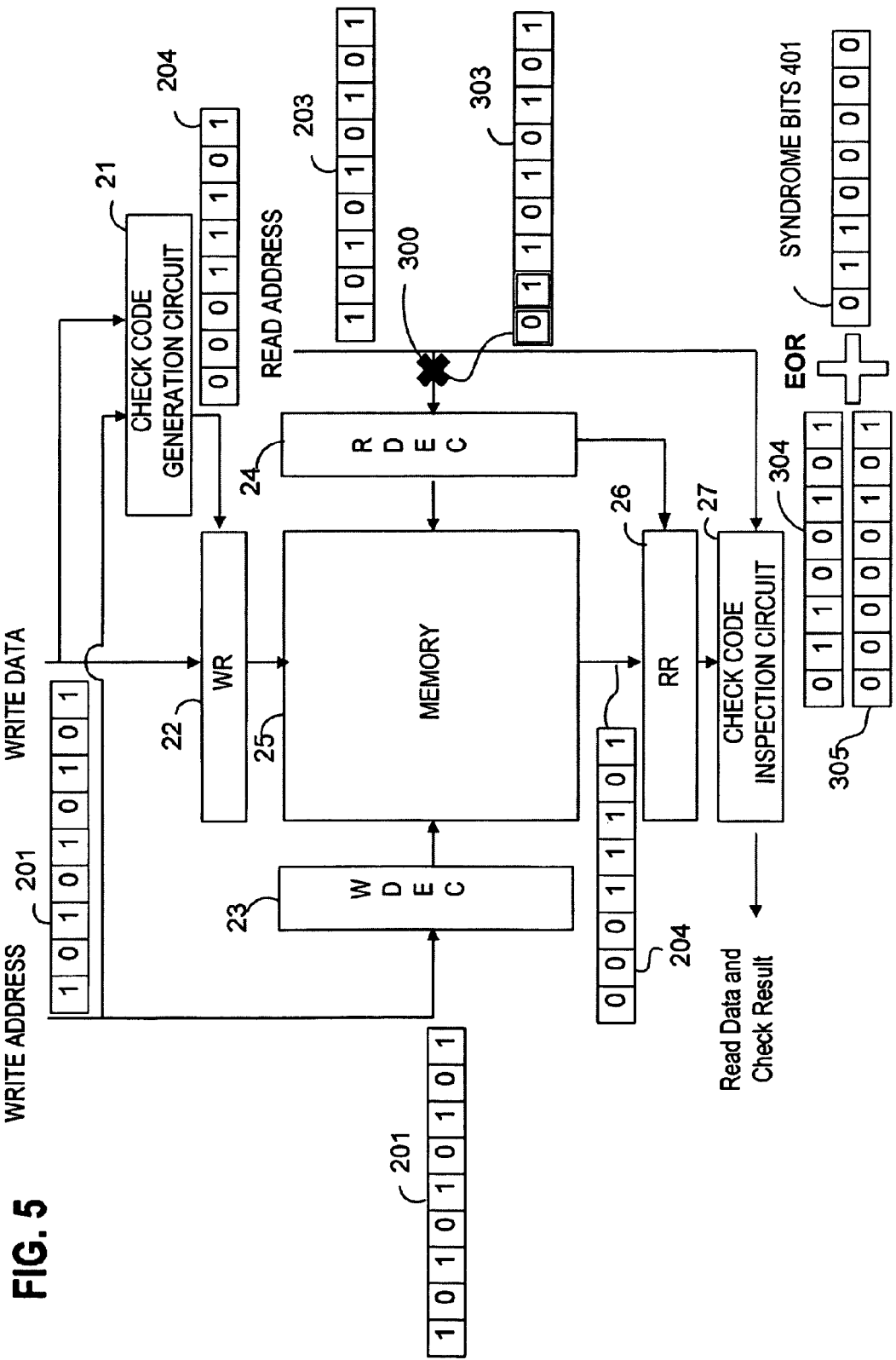
FIG. 5 is an explanatory view of how error detection is carried out in the case of a two-bit error in the read address.

FIG. 5 is an explanatory view of how error detection is carried out in the case of a two-bit error in the read address 203. FIG. 5 is the same as FIG. 4 except that a two-bit error occurs.

FIG. 5 illustrates how two bit inversions occur in the address because of the faulty location 300 halfway along the path through which the read address 203 is input to the read decoder 24. A data write is carried out normally, and the data and the check code are stored at the address "101010101."

Then, the read address 203 ("101010101") is specified to read the data written. The read decoder 24 receives the faulty address 303 ("011010101") as a result of the read address 203 passing through the faulty location 300 and developing two bit inversions (the first and second bits in the read address inverted here). The data and the check code stored at the corresponding address are input to the check code inspection circuit 27 via the read register 26.

On the other hand, the read address 203 is input normally to the check code inspection circuit 27. The check code inspection circuit 27 generates the syndrome bits 401 based on the data and check code that have been read and the read address 203 ("101010101"). The generated syndrome bits 401 are the exclusive-OR of the check code 304 ("01100101") at the faulty address 303 ("011010101") and the check code 305 ("00000101") at the read address 203 ("101010101"). Here, the syndrome bits 401 are "01100000", and two bit inversions in the address are detected as a two-bit data error.

Figure 6:
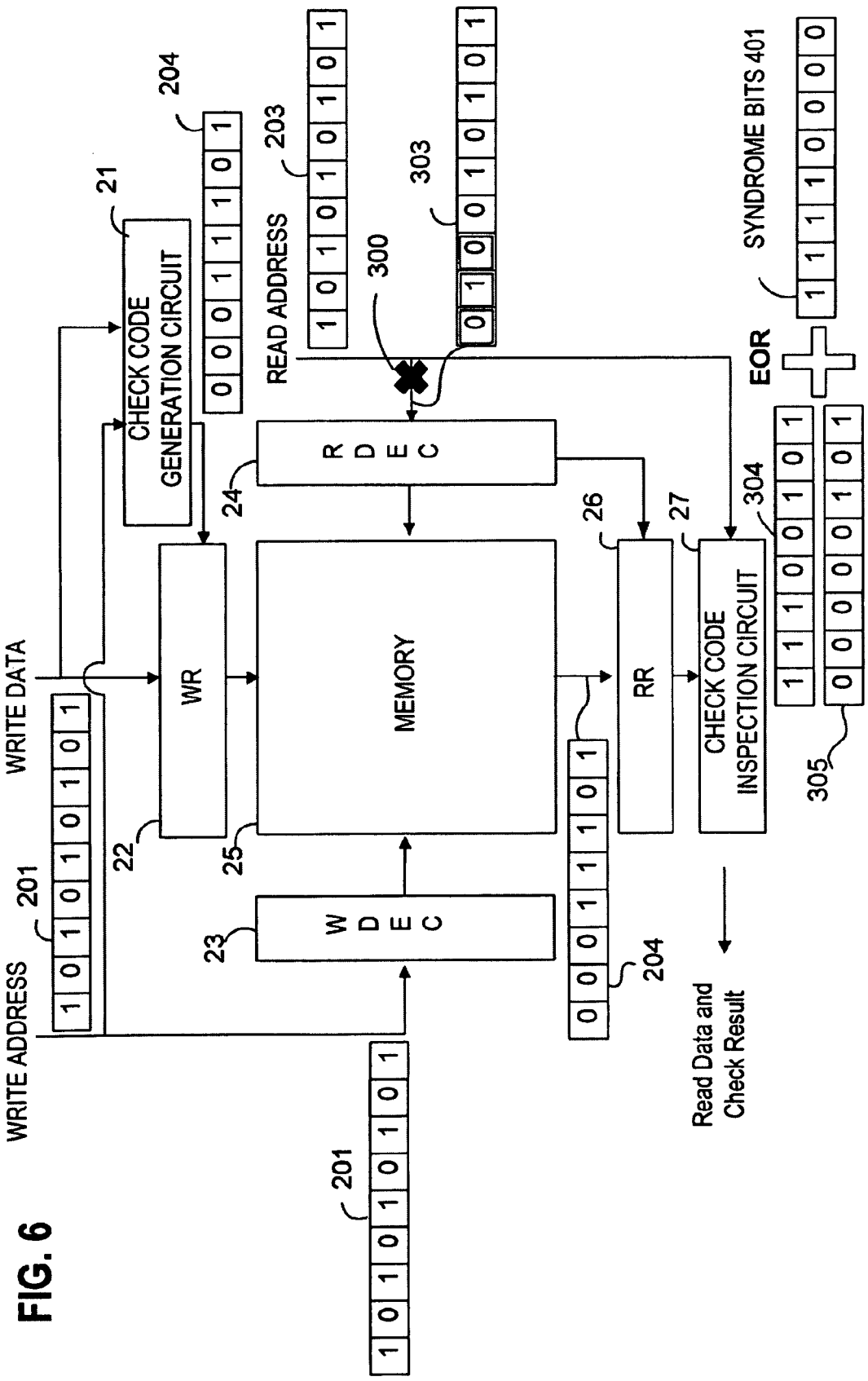
FIG. 6 is an explanatory view of how error detection is carried out in the case of a three-bit error in the read address.

FIG. 6 is an explanatory view of how error detection is carried out in the case of a three-bit error in the read address 203. FIG. 6 is the same as FIG. 4 except that a three-bit error occurs.

FIG. 6 illustrates how three bit inversions occur in the address because of the faulty location 300 halfway along the path through which the read address 203 is input to the read decoder 24. A data write is carried out normally, and the data and the check code are stored at the address "101010101."

Then, the read address 203 ("101010101") is specified to read the data written. The read decoder 24 receives the faulty address 303 ("010010101") as a result of the read address 203 passing through the faulty location 300 and developing three bit inversions (the first, second and third bits in the read address inverted here). The data and the check code stored at the corresponding address are input to the check code inspection circuit 27 via the read register 26.

On the other hand, the read address 203 is input normally to the check code inspection circuit 27. The check code inspection circuit 27 generates the syndrome bits 401 based on the data and check code that have been read and the read address 203 ("101010101"). The generated syndrome bits 401 are the exclusive-OR of the check code 304 ("11110101") at the faulty address 303 ("010010101") and the check code 305 ("00000101") at the read address 203 ("101010101"). Here, the syndrome bits 401 are "11110000", and three bit inversions in the address are detected as a two-bit data error. As described above, address errors are detected as even bit errors in the syndrome bits 401.

In going through individual bits of the check codes row by row in the check code bit patterns illustrated in FIGS. 3A to 3C, if a row has a number of "x" marks, as many stages of EOR gates as the number of "x" marks will be connected. This results in a longer delay. For this reason, the check code generation circuit 21 and the check code inspection circuit 27 can be designed so as to average the numbers of "x" marks in individual rows and thereby reduce the EOR gates connected in a plurality of stages.

FIG. 7 is an example of an address-related bit pattern aimed at reducing the stage count of the EOR gates. If FIG. 3C is replaced by FIG. 7, it is apparent that the number of stages of the EOR gates required for a first bit C0 of the check code is fewer than in FIG. 3C.

On the other hand, while, in the present embodiment, eight bits (C0 to C7) are used as a check code, the bit count x required for the check code need only fulfill the following condition. That is, if a combination is expressed as nCr when r things are taken from n things without considering permutation, xCd>(data bit count) must be true for the data. Here, d is all odd numbers, 3 or greater, that are used to encode the data. As a result, (8C3=56)+(8C5=56)+(8C7=8)=120. This number is greater than the data bit count of 32. It is, therefore, apparent that the condition is fulfilled.

As for the address, two conditions must be fulfilled. The first condition is that xCa>(address bit count) must be true. Here, a is all even numbers, 2 or greater, that are used to encode the data. As a result, (8C2=28)+(8C4=70)+(8C6=28)+(8C8=1)=127. This number is greater than the address bit count of 9. It is, therefore, apparent that the condition is fulfilled. The second condition for the address is that the check code bit count must be greater than the bit counts within the address groups. Here, the address groups are divided into two groups, one from bits A0 to A6 and the other with bits A7 and A8. These groups respectively have seven and two bits, whereas the check code has a bit count of eight bits, which is greater than those of the address groups. Therefore, it is apparent that the condition is fulfilled.

Next, address grouping examples will be described.

FIG. 8A is a view illustrating the physical memory configuration in the present embodiment. This figure illustrates that the memory is divided into four columns (columns 0 to 3) and that 40 bits of data, the sum of the bit counts of the data and the check code, are written.

FIG. 8B is an extracted and explanatory view of a column. Each column contains storage elements capable of storing 128 sets of 40-bit data (rows 0 to 127).

FIG. 8C is an explanatory view of address grouping. In the case of the memory illustrated in FIGS. 8A to 8C, of the 9-bit address, seven bits from the first bit are used to specify a row, whereas the remaining two bits a column. This address group is divided into two parts, seven bits to specify a column and two bits to specify a column.

So far, description has been given of the detection of address errors during a data read. As is apparent from the above description, the check code written to the memory contains encoded write address information, and the mismatch between this information and the read address is detected as an address error. This makes it easily assumable that write address errors as well as read address errors can be detected. We assume that the write address becomes faulty and that the data and the check code are written to a wrong address in the memory. It is to be noted that we assume that the check code has been generated from the correct write address. If the data and the check code, written to the wrong address, are read and the check code is inspected, the read address and the write address information, contained in the read check code, do not match. Therefore, the address error can be detected. It is to be noted, however, that in the event of an error in the write address, old data and check code remain at the address to which the new data and check code should have been written. Even if the old data and check code are read, the read address and the write address information in the read check code match. Therefore, the address error cannot be detected. To detect the error when the old data and check code are read, a roll bit is added whose value is inverted each time addresses, specified to write the data to or read it from the storage unit, cycle.

Figure 9A:
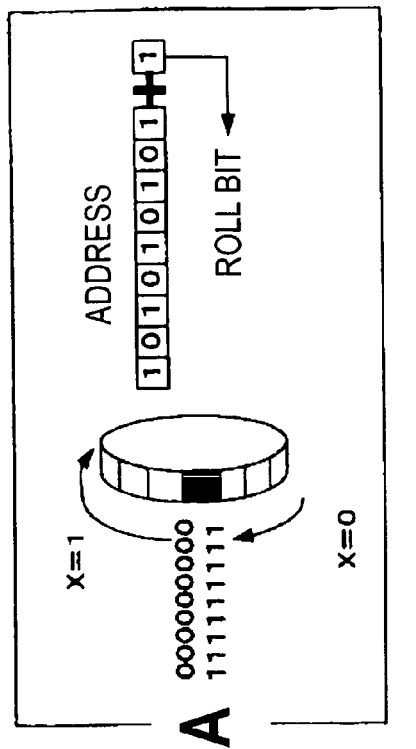
FIG. 9A is an explanatory view of a roll bit.

FIG. 9A is an explanatory view of the roll bit. The first 9-bit address is "000000000", whereas the address of the last is "111111111." The roll bit is inverted each time the addresses cycle from "000000000" to "111111111", then return back to "000000000" again.

Figure 9B:
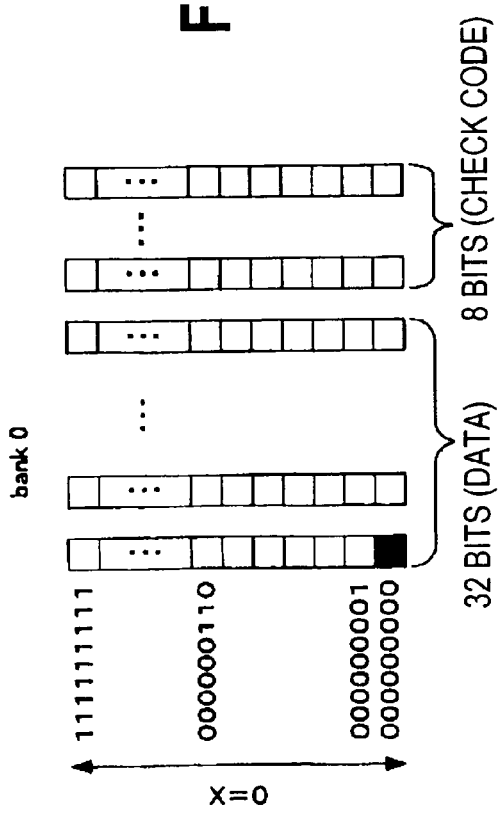
FIG. 9B is an explanatory view of a data write in the first cycle.

FIG. 9B is an explanatory view of a data write in the first cycle. At the time of the data write in the first cycle, a check code is generated with the roll bit set to 0, and is written together with the data.

Figure 9C:
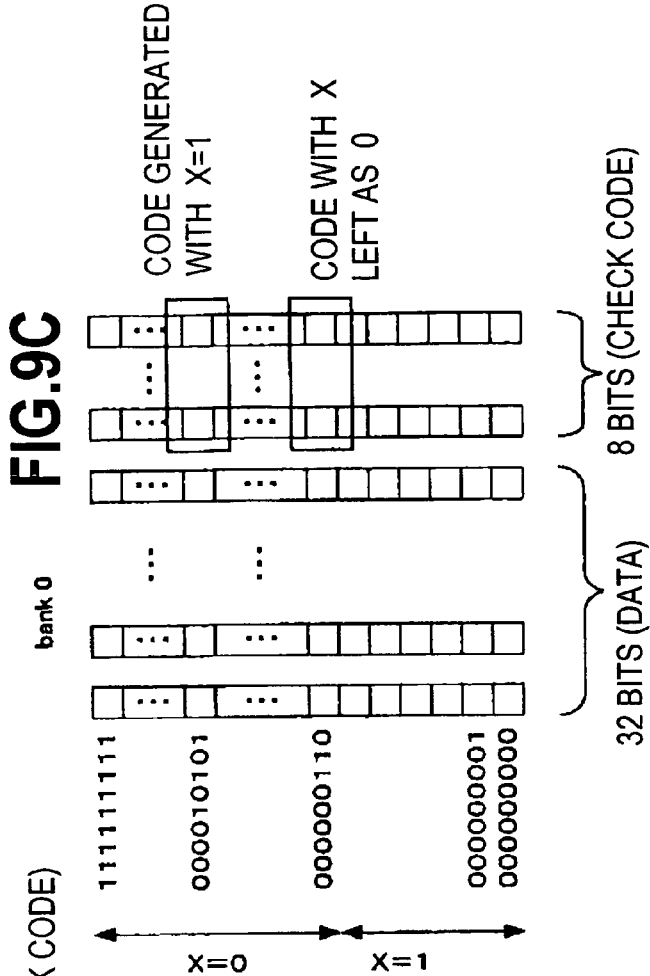
FIG. 9C is an explanatory view of the data write in the second cycle.

FIG. 9C is an explanatory view of a data write in the second cycle. At the time of the data write in the second cycle when the write address 201 passes through the first address, a check code is generated with the roll bit set to 1, and is written together with the data. We assume that in FIG. 9C, three bit inversions occur during an attempt to write data of the second cycle to an address "000000110" and that, as a result, the data is written to an address "000010101."

The check code generated when the roll bit was set to 0 remains in the memory 25 corresponding to the address "000000110." The check code generated with the roll bit set to 1 is stored in the memory 25 corresponding to the address "000010101" (despite the fact that the surrounding memory area is that with a roll bit of 0).

Next, we assume that a data read is carried out with the roll bit specified as 1. In this case, if the data is read from the address "000000110" and checked for error, an error will be detected because of the check code, generated with a roll bit of 0, remaining at this address.

FIG. 10 is an example of an address-related bit pattern when the roll bit is assigned. This figure illustrates, as compared to FIG. 3C, an example whose bits are all set to ON when the added roll bit (AX) is 1. Even in this case, the roll bit is encoded with an even number of bits.

Figure 11:
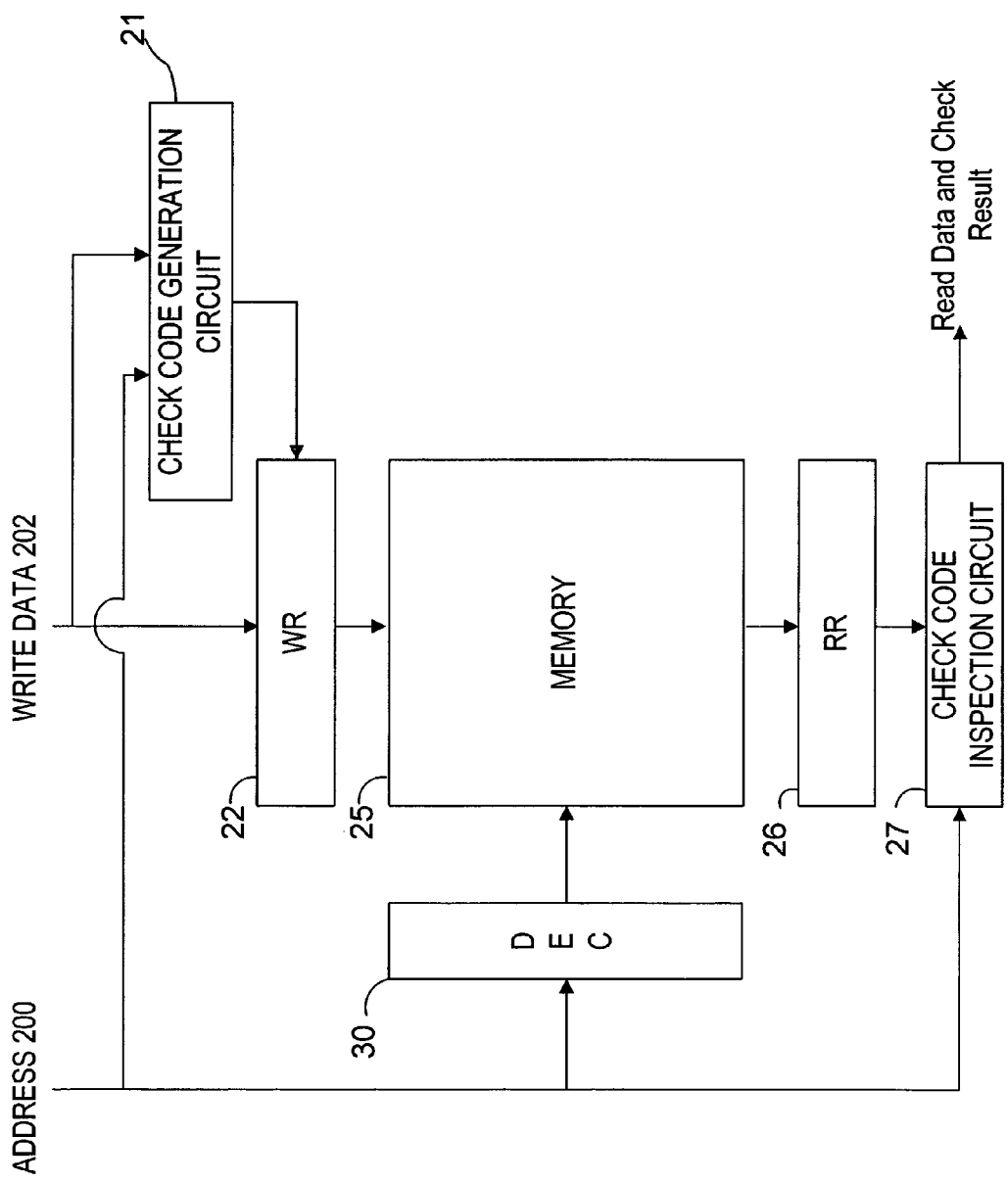
FIG. 11 is a view illustrating a modification example of the storage control circuit of the present embodiment.

FIG. 11 is a view illustrating a modification example of the storage control circuit of the present embodiment. The modification example differs from the storage control circuit illustrated in FIG. 2 in that it is available in a single port configuration having a decoder (DEC) 30 combining the functionality of the write decoder 23 and the read decoder 24, rather than a two-port configuration with the write decoder 23 and the read decoder 24 provided separately. The decoder 30 receives the write and read addresses as addresses 200 and processes each of these addresses.

Even in this case, a similar effect can be obtained as with the storage control circuit of the present embodiment having the configuration illustrated in FIG. 2.

As described above, the storage control circuit of the present embodiment changes the coding systems for codes assigned to the address and the data, thus allowing detection of even a multi-bit error occurring in the address. In the storage control circuit of the present embodiment, the code assigned to the address is encoded with two bits. Therefore, errors occurring in the address are detected as two-bit data errors in the syndrome bits.

Moreover, the storage control circuit of the present embodiment has a virtual bit called roll bit added to the address and encoded in the same manner, thus allowing detection of an error at an address not subjected to a data write.

While the illustrative and presently preferred embodiment of the present invention has been described in detail herein, it is to be understood that the inventive concepts may be otherwise variously embodied and employed and that the appended claims are intended to be construed to include such variations except insofar as limited by the prior art.

What is claimed is:

1. A storage control circuit comprising:
   a storage unit to store data in a storage area specified by an address;
   a check code generation unit to generate, based on data written to the storage unit and the address specified to write the data, a check code to be stored in the storage unit in correspondence with the data written to the storage unit; and
   a check code inspection unit to conduct an error check based on data read from the storage unit, a check code corresponding to the data read, and the address specified to read the data, wherein
   the check code generation unit and the check code inspection unit generate a first code whose number of non-zero bits is an even number by encoding the first code assigned to the address with the even number of bits, and generate a second code whose number of non-zero bits is an odd number by encoding the second code assigned to the data written to the storage unit with the odd number of bits; and
   the check code generation unit and the check code inspection unit generate or inspect a check code corresponding to the data written or the data read based on the first and second codes.

2. The storage control circuit of claim 1, wherein
   the address is delimited and divided into a plurality of groups each having one or a plurality of bits; and
   the first code is encoded with the even number of bits using a bit pattern that can identify the fault of every one or plurality of bits in each of the plurality of groups.

3. The storage control circuit of claim 2, wherein
   a roll bit whose value is inverted each cycle of address specified to write the data to or read the data from the storage unit is further assigned to the address; and
   the first code assigned to the address containing the roll bit is encoded with the even number of bits.

4. The storage control circuit of claim 1, wherein
   a roll bit whose value is inverted each cycle of address specified to write the data to or read the data from the storage unit is further assigned to the address; and
   the first code assigned to the address containing the roll bit is encoded with the even number of bits.

5. A method of checking address errors in a storage control circuit having a storage unit to store data in a storage area specified by an address, the method comprising:
   generating a first code whose number of non-zero bits is an even number by encoding first code assigned to the address with the even number of bits;
   generating a second code whose number of non-zero bits is an odd number by encoding the second code assigned to the data written to the storage unit with the odd number of bits;
   generating a check code based on the first and second codes;
   storing the check code in the storage unit in correspondence with the data written to the storage unit; and
   conducting an error check based on data read from the storage unit, a check code corresponding to the data read, and a read address.

6. The address error check method of claim 5, wherein
   the address is delimited and divided into a plurality of groups each having one or a plurality of bits; and
   the first code is encoded with the even number of bits using a bit pattern that can identify the fault of every one or plurality of bits in each of the plurality of groups.

7. The address error check method of claim 5, wherein
   a roll bit whose value is inverted each cycle of address specified to write the data to or read the data from the storage unit is further assigned to the address; and
   the first code assigned to the address containing the roll bit is encoded with the even number of bits.

* * * * *